US005671294A

United States Patent [19]
Rogers et al.

[11] Patent Number: 5,671,294
[45] Date of Patent: Sep. 23, 1997

[54] SYSTEM AND METHOD FOR INCORPORATING SEGMENTATION BOUNDARIES INTO THE CALCULATION OF FRACTAL DIMENSION FEATURES FOR TEXTURE DISCRIMINATION

[75] Inventors: George W. Rogers; Carey E. Priebe, both of King George; Jeffrey L. Solka, Fredericksburg; Richard A. Lorey, Dahlgren; Erik G. Julin, Fredericksburg, all of Va.

[73] Assignee: The United States of America as represented by the Secretary of the Navy, Washington, D.C.

[21] Appl. No.: 308,112

[22] Filed: Sep. 15, 1994

[51] Int. Cl.⁶ .................................. G06K 9/62; G06K 9/74
[52] U.S. Cl. ........................ 382/228; 382/108; 382/173
[58] Field of Search .................................. 382/108, 131, 382/132, 199, 224, 228, 249, 173; 395/130

[56] References Cited

U.S. PATENT DOCUMENTS

| | | | |
|---|---|---|---|
| 4,789,933 | 12/1988 | Chen | 364/413.13 |
| 5,003,979 | 4/1991 | Merickel | 128/653 A |
| 5,016,173 | 5/1991 | Kenet et al. | 382/190 |
| 5,057,939 | 10/1991 | Kirk | 358/426 |
| 5,093,869 | 3/1992 | Alves | 382/22 |
| 5,101,446 | 3/1992 | Resnikoff | 382/56 |
| 5,148,497 | 9/1992 | Pentland | 382/54 |
| 5,204,920 | 4/1993 | Moran | 382/54 |
| 5,274,715 | 12/1993 | Hsu | 382/28 |
| 5,341,142 | 8/1994 | Reis et al. | 342/64 |
| 5,351,311 | 9/1994 | Rogers et al. | 382/294 |
| 5,365,472 | 11/1994 | Solka et al. | 364/807 |
| 5,384,895 | 1/1995 | Rogers et al. | 395/24 |
| 5,430,445 | 7/1995 | Peregrim et al. | 342/25 |
| 5,517,531 | 5/1996 | Bond et al. | 375/350 |

OTHER PUBLICATIONS

Takaya et al., Multiresolution 2–dimensional edge analysis using wavelets, May 1993, pp. 376–380.
Leung et al., Image segmentation using maximum entrapy method, Apr. 1994, pp. 29–32.
Therrien, Decision estimation and classification, 1989, pp. 98–105.
Peli et al., Mult–scale fractal and correlation signatures for image screening and natural clutter suppression, 1989, pp. 402–415.
Chen, et al., Fractal feature analysis and classification in medical imaging, Jun. 1989, pp. 133–142.
Peleg et al., Multiple resolution texture analysis and classification, Jul. 1984, 518–523.

*Primary Examiner*—Joseph Mancuso
*Assistant Examiner*—Timothy M. Johnson
*Attorney, Agent, or Firm*—James B. Bechtel, Esq.

[57] ABSTRACT

Image analysis is performed by defining segmentation boundaries within an image by using wavelet theory or some other suitable method. Such boundaries can be incomplete, irregular, and/or multi-valued. The segmentation boundaries are then incorporated into feature calculations related to fractal dimensions for each pixel using a diffusion related method or a Dijkstra potential related method. These features are then used in statistical techniques to distinguish among textures or classes of interest. The system performing the image analysis is trained (or supervised) on data from different classes within an image or images. This enables the system to then later identify these classes in different images. The system can be used for Computer Aided Diagnosis (CAD) of mammograms or other medical imagery.

15 Claims, 10 Drawing Sheets

SYSTEM AND METHOD FOR INCORPORATING SEGMENTATION BOUNDARIES INTO THE CALCULATION OF FRACTAL DIMENSION FEATURES FOR TEXTURE DISCRIMINATION

BACKGROUND OF THE INVENTION

The present invention relates to a system for image analysis, and more particularly, to a method for incorporating segmentation boundaries into the calculation of fractal dimension features which can then be used to discriminate among various types of textures.

One component of the quest for artificial vision is that of texture recognition/classification. An approach to this segment of the vision problem which has shown promise is based on the computation of fractal dimension and/or related power law features. In *The Fractal Geometry of Nature* by B. B. Mandelbrot, a fractal is defined is being any object whose Hausdorff-Besicovitch dimension exceeds its topological dimension. Properties that characterize fractals are self-similarity and the prescribed variation of a measured quantity with scale. Self-similarity can be thought of as the propagation of geometric features across scale space, wherein an image looks the same when viewed from different size perspectives. The manner in which measured properties vary across scale space is known as Richardson's law:

$$M(\epsilon) = K\epsilon^{d-D} \quad (1)$$

In equation (1), $M(\epsilon)$ represents the measured property at scale $\epsilon$, K is a constant, d is the topological dimension, and D is the Hausdorff-Besicovitch dimension (i.e. fractal dimension). This formula provides a method to estimate the fractal dimension D of an image, which can then be used to derive power law features that are helpful for texture discrimination. This general method has been disclosed by T. Peli et al. in describing a so called "covering method". See the article entitled *Multi-Scale Fractal and Correlation Signatures for Image Screening and Natural Clutter Suppression* (SPIE Vol. 1199, Visual Communications and Image Processing IV, (1989)). That method essentially follows three steps with: (1) recursive application of morphological (i.e. erosion and dilation) operators; (2) average area computation over windows; and (3) pixel-by-pixel regression.

While Peli's technique produces adequate results in certain applications, we have disclosed that it must be improved upon in order to be useful for critical applications such as computer aided diagnosis (CAD) of mammograms or other medical imagery. In particular, we have observed superior results when texture analysis incorporates the detection of segmentation boundaries within the image. Without detecting and utilizing such boundaries, our research has found that features for pixels near a segmentation boundary are not textually pure. That is, a given feature is calculated using a contribution of multiple textures. This procedure could result in misidentification of, or even failure to detect, a given texture.

Another recent technique is found in U.S. Pat. No. 5,274,715 entitled *Characterizing Image Texture* issued to Hsu on 28 Dec. 1993 which discloses a method for calculating features of an image. The method operates upon an image segment (patch) and derives features based upon the entire segment. This technique however, does not perform fractal dimension calculations at all, rather it calculates textures in an image and separates, or segments, one texture from another. While this type of segmentation may be useful in its own right, Hsu '715 does not address the ability of using a texture from one image to classify textures, or classes, in a different image. Accordingly, this reference has limited applicability to computer assisted diagnosis of medical imagery.

U.S. Pat. No. 5,204,920 entitled *Method and Apparatus For Region And Texture Coding* issued to Moran et al. on 20 Apr. 1993, is concerned primarily with image segmentation. More specifically, it uses segmentation information to make adjustments to regions to make them more homogeneous. That is, Moran et al. '920 actually makes changes to regions within an image. Also, Moran et al. '920 performs no fractal dimension calculations, nor does it engage in feature extraction for classification. Accordingly, Moran '920 is impaired by the limited results produced.

U.S. Pat. No. 5,148,497 entitled *Fractal-Based Image Compression And Interpolation* issued to Pentland et al. on 15 Sep. 1992 uses the fractal nature of images to predict information in higher frequency subbands or in noisy subbands. This fractal characteristic of self similarity is used to add details to an original image. Unfortunately, Pentland '497 makes changes to an image, and thereby fails to maintain a higher degree of textural purity. Furthermore, Pentland et al. '497 does not perform feature extraction or texture classification, and accordingly can not be reliably used in assisting the diagnosis of medical imagery.

U.S. Pat. No. 5,101,446 entitled *Method And Apparatus For Coding An Image* issued to Resnikoff et al. on 31 Mar. 1992 alludes to an image compression system based on wavelet coefficients. That is, the system attempts to use wavelet coefficients to reduce the amount of data needed to store an image. While art such as Resnikoff et al. may have merit in certain contexts, we believe it to be inadequate for use in advanced medical imagery techniques since it fails to provide accurate texture characterization and classification information.

U.S. Pat. No. 5,093,869 entitled *Pattern Recognition Apparatus Utilizing Area Linking And Region Growth Techniques* issued to Alves et al. on 3 Mar. 1992 discloses a graphical theoretic technique for extracting low level features of an image. The features extracted from this system are actually "scenes". That is, the system is designed to recognize items such as buildings, trucks, tanks and ships. We believe that art of this type is unable to yield the beneficial results when applied to medical imagery techniques because it provides no feature extraction based on fractals or of texture classification based on adaptive mixtures.

U.S. Pat. No. 5,057,939 entitled *Data Compression* issued to Kirk on 15 Oct. 1991 is a tree-based data compression technique which utilizes the differences between digital values of adjacent pixels. This reference is not fractal based, is not a texture classification system, and therefore is not capable of being used in the arenas of texture discrimination.

U.S. Pat. No. 5,003,979 entitled *System And Method For The Noninvasive Identification And Display Of Breast Lesions And The Like* issued to Merickel et al. discloses an image processing and pattern recognition system using Fourier transforms and polar coordinate maps. It is not a fractal dimension based feature system however, and therefore does not enjoy the benefits associated with utilizing power law features. The system models distributions of intensities, it does not process images to extract features. Furthermore, Merickel et al. '979 uses multidimensional images (MRI, PET) and does not address two dimensional images. Accordingly, art such as this, while useful, could not be used in mammographic screening programs involving large segments of the population because of the high associated cost.

SUMMARY OF THE INVENTION

Accordingly, it is an object of the present invention to provide an improved image analysis system for generating a texturally pure image.

It is another object to provide an image analysis system which is useful for computer aided diagnosis (CAD) of mammograms or other medical imagery.

It is still another object to provide an image analysis system that will provide a cost efficient means for providing mammographic screening programs to large segments of the population.

It is yet another object to provide an image analysis system that incorporates segmentation boundaries into the calculation of fractal dimension features which can then be used to distinguish among different types of textures.

It is still yet another object to provide an image analysis system that defines segmentation boundaries using wavelet theory or another reliable method.

It is also an object to provide an image analysis system that will detect segmentation boundaries even though they are incomplete, irregular, or multi-valued.

It is also another object to provide an image analysis system that classifies textures from various images, and then uses these classifications to identify given textures in other images.

These and other objects may be achieved according to the principles of the present invention by providing a system that analyzes a digitized image by defining segmentation boundaries within the digitized image using a reliable technique such as wavelet theory. The defined segmentation boundaries are then incorporated into feature calculations for each pixel in the image using either a diffusion related method or a method that is related to a Dijkstra potential. These features are then used in statistical techniques to distinguish textures (or classes) of interest within the image. The system can be trained (i.e. operated in a supervised manner) on data from different classes in an image (or images), and then can be used to detect and identify these classes in different images.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
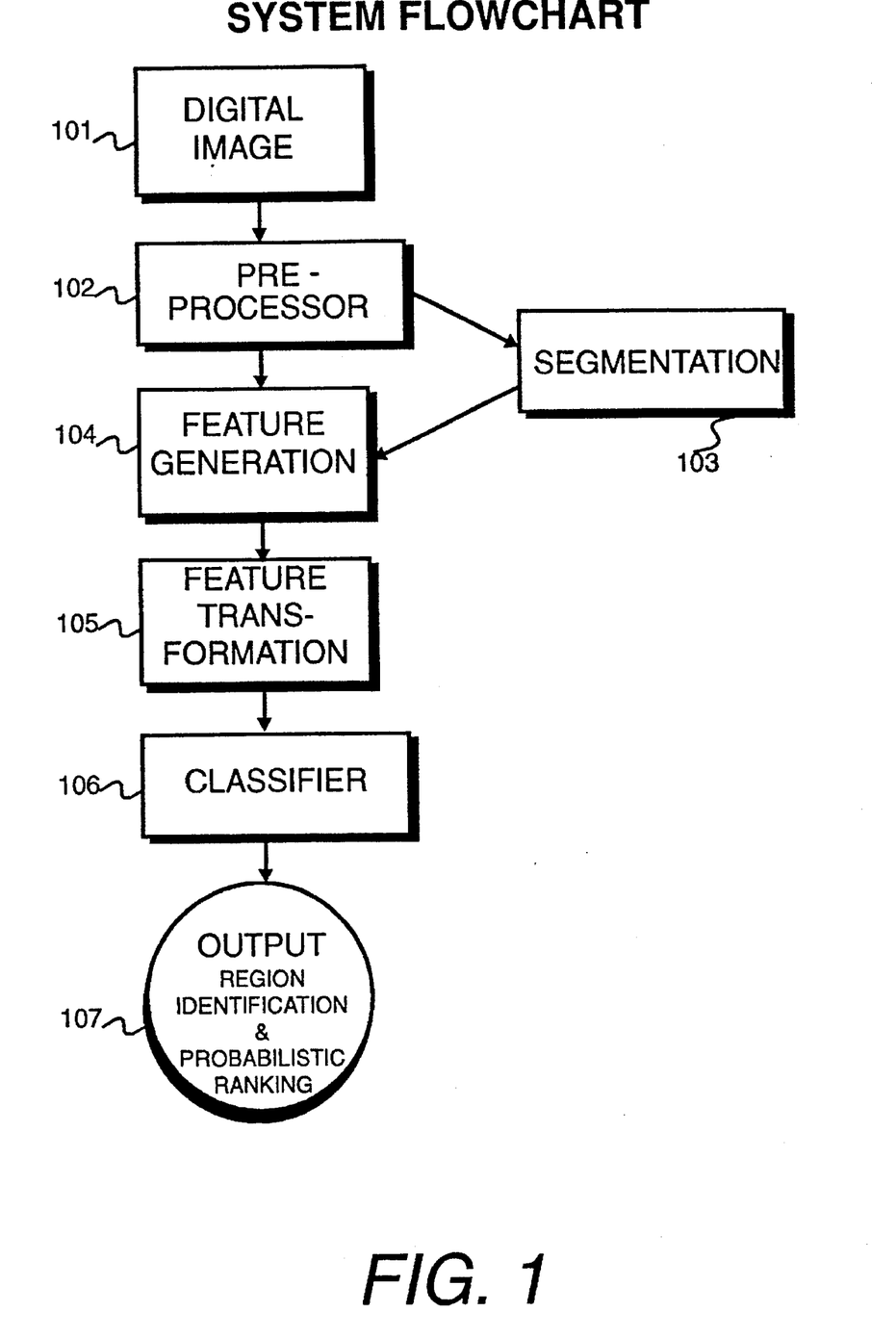
FIG. 1 illustrates operation of an image analysis system constructed according to the principles of the present invention.
Figure 2A:
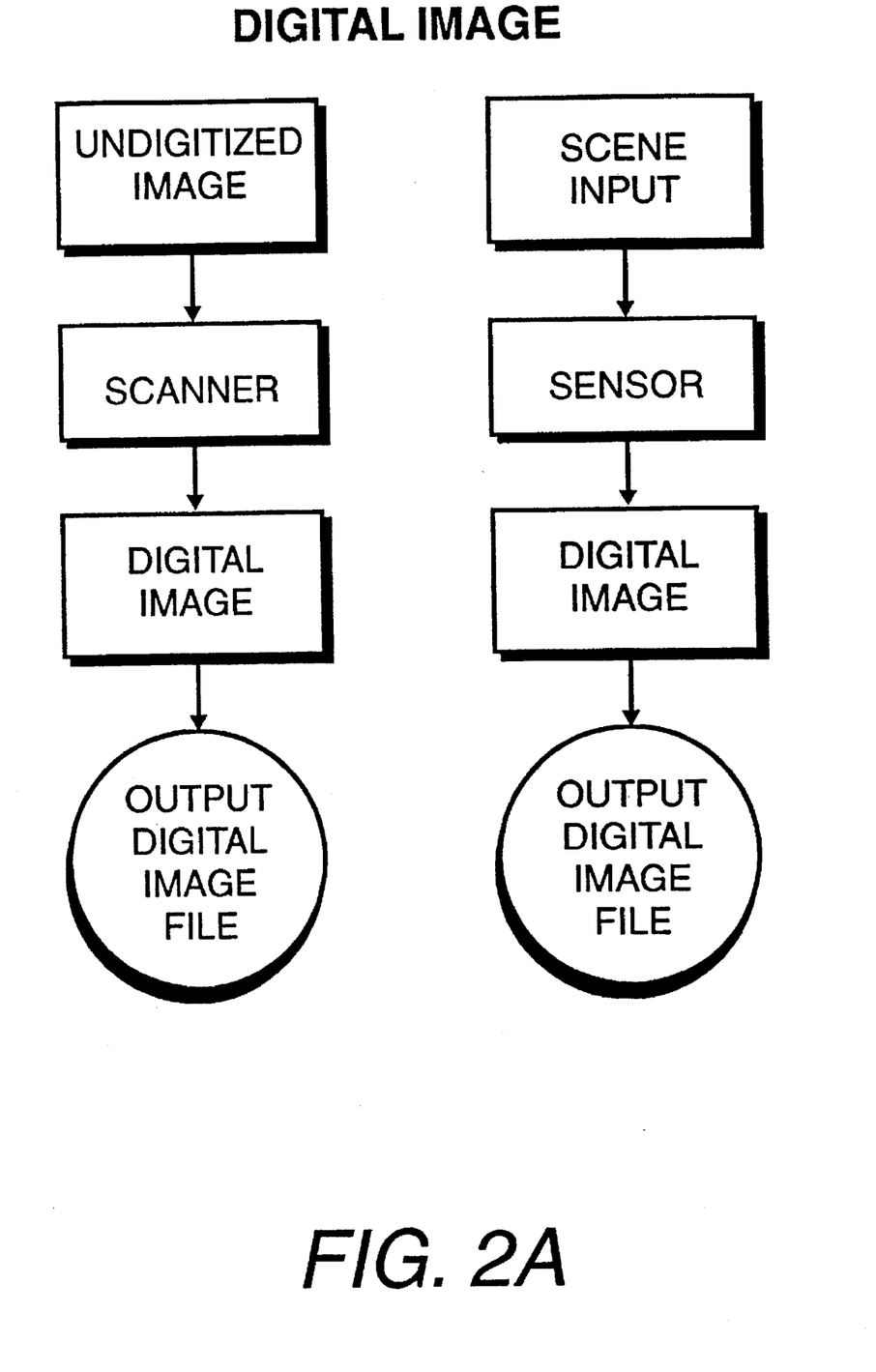
FIGS. 2A through 2E further define steps of the flowchart depicted in FIG. 1.
Figure 2B:
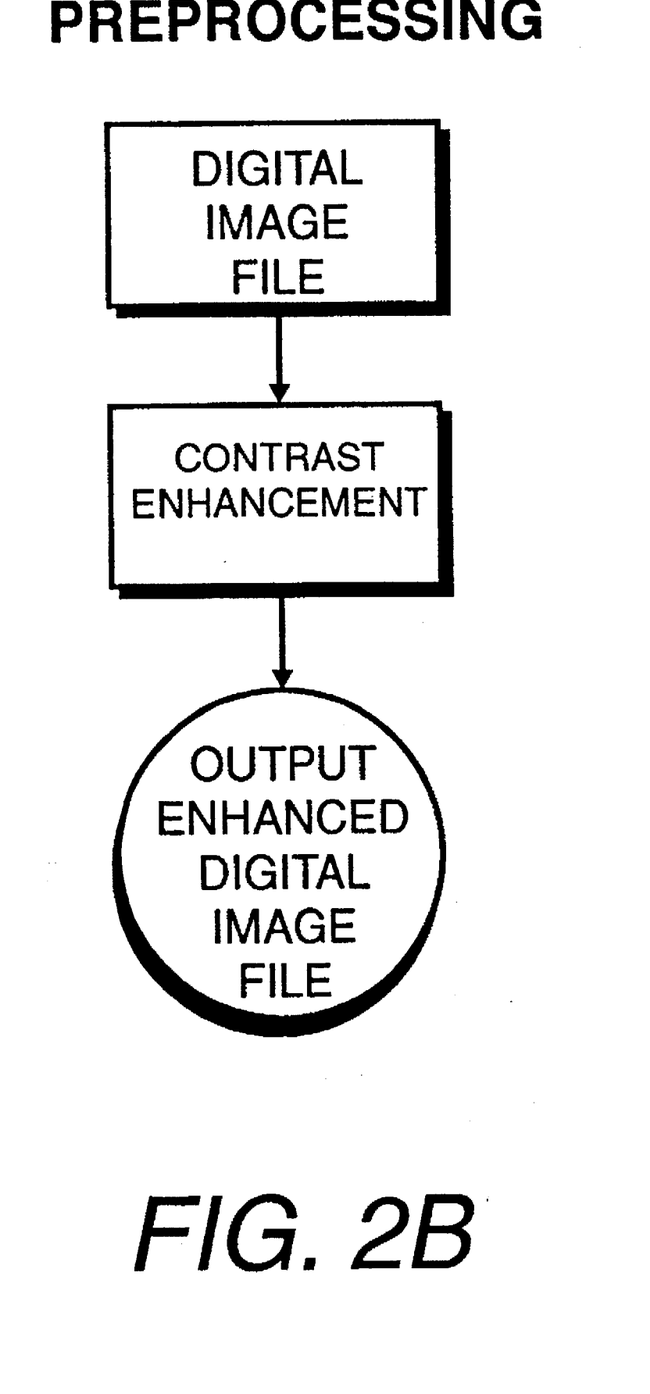
Figure 2C:
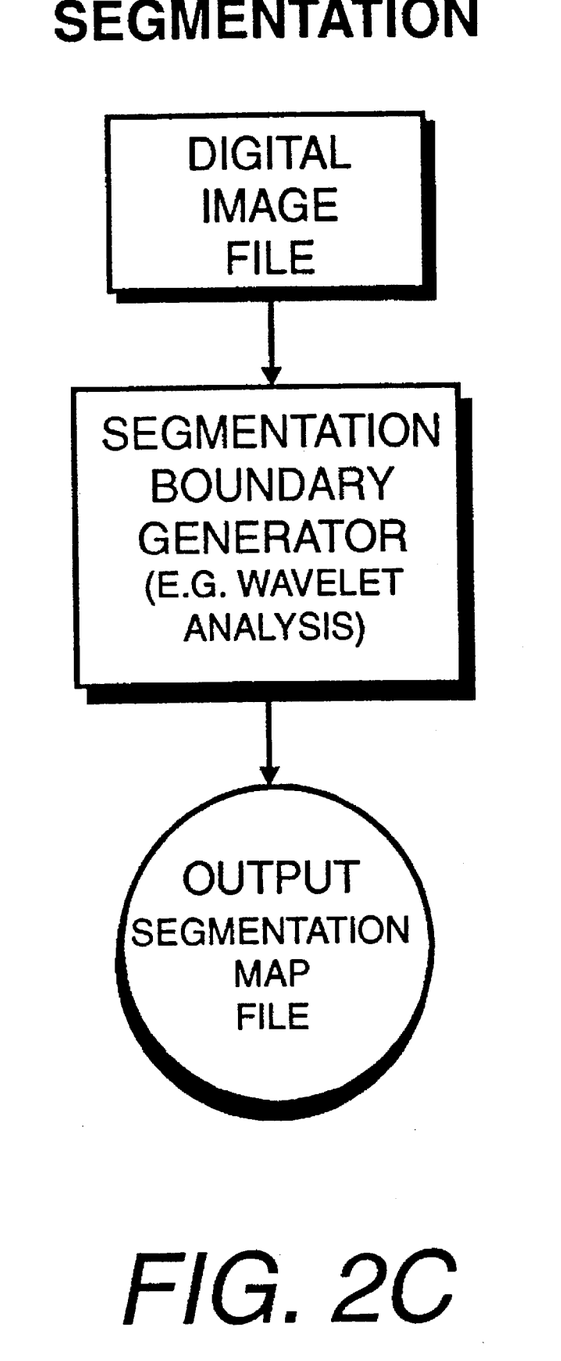

Referring to FIG. 1 and FIG. 2A, a digital image is generated in step 101 by either using a digital scanner to obtain a grayscale image, or through use of a sensor capable of directly producing a digital image. A digital image file is then generated from the digital image. In step 102, an optional preprocessing stage is depicted wherein an enhanced digital image is generated, when required, pursuant to a contrast enhancement technique (see FIG. 2B). If the originally generated digital image is of acceptable quality, preprocessing is not necessary. When preprocessing is performed, an enhanced digital image file is generated. Next, in step 103, a segmentation procedure is initiated and a segmentation map file is thereby produced (see FIG. 2C). That is, segmentation boundaries within the digital image are defined. Our research indicates that wavelet theory provides a preferrable method for defining such boundaries. However, we acknowledge that other competent and reliable methods for performing this step do exist. The wavelet feature extraction method is based on the construction of a two-dimensional wavelet maxima tree. We denote by $C^p_{2^j}$, a wavelet maxima contour (i.e. a segmentation boundary) containing $n_p$ wavelet maxima at scale $2^j$. Accordingly, $$C^p_{2^j} = \{\_m_k = \_[x_k, y_k, W^{1,1}_{2^j}f(x_k,y_k), W^{2}_{2^j}f(x_k,y_k)]\} \quad (2)$$

where $m_k$ is a wavelet maximum on the contour $C^p_{2^j}$, k=1, 2, ..., $n_p$}.

A wavelet maxima contour, indicative of a segmentation boundary, containing $n_p$ wavelet maxima at the neighboring finer scale $2^{j-1}$ is $$C^q_{2^{j-1}} = \{\_m_l = \_[x_l, y_l, W^{1}_{2^{j-1}}f(x_l,y_l), W^{2}_{2^{j-1}}f(x_l,y_l)]\} \quad (3)$$

where $m_l$ is a wavelet maximum on the contour $C^q_{2^{j-1}}$, l=1, 2, ..., $n_q$}.

There are four sequences of two-dimensional wavelet reproducing kernels (hereafter "WRKs") resulting from wavelets in two orientations. We denote by $\{K^{1,1}_{ij}\}$ and $\{K^{2,2}_{ij}\}$, the sequences of WRKs for intra-orientation, and denote by $\{K^{1,2}_{ij}\}$ and $\{K^{2,2}_{ij}\}$, the sequences of WRKs for inter-orientations. A measure of interaction between wavelet maxima contours (i.e. segmentation boundaries) at two neighboring scales can be defined with these WRKs and is used to construct the wavelet maxima tree.

To further refine the tree, we also design a window for tracking wavelet maxima contours from course to fine scales. We denote by $\Delta_j$, the size of a square window bounding the regions of support of the four WRKs from scale $2^j$ to $2^{j-1}$. We further define a point tracking window, $b_j$ of size $\beta\Delta_j$, where $\beta$ is a constant. For an arbitrary wavelet maxima contour $C^p_{2^j}$, we put point tracking window $b_j$ on each of the wavelet maxima on contour $C^p_{2^j}$ with the window center directly upon the wavelet maximum. There are two choices for the contour tracking window, $B^p_j$. One is the envelope bounding all $b_j$'s, and the other is the smallest rectangular window enclosing all $b_j$'s. We choose the latter for computational efficiency.

Although it is theoretically possible for wavelet maxima contours to split and merge in both directions of scale changes, we shall impose a one-way causality to reduce algorithmic complexity. We assume that the maxima contours or segmentation boundaries can only split but not merge as scale decreases, and only merge but not split as scale increase This assumption basically agrees with our visual experiences that features often break into details at fine scales, but join together at course scales. Furthermore, it is reasonable to assume that a wavelet maxima contour split from another one should be in close geometric proximity to its originator at the coarser scale. To be specific, the planar distance between the two contours should not be much greater than the average length of the two contours. Also, the planar angle between the two contours should be rather small. We denote by $d_{p,q}$ and $a_{p,q}$, the distance and angle between the two wavelet maxima contours or boundaries $C^p{}_{2^j}$ and $C^q{}_{2^{j-1}}$ at neighboring scales. We accept $C^q{}_{2^{j-1}}$ as a split component from $C^p{}_{2^j}$ if $$d_{p,q} = \gamma \sqrt{n_p n_q} \qquad (4)$$

and $$a_{p,q} < a_o \qquad (5)$$

where $\gamma$ and $a_o$ are constants. We have used $\gamma=0.5$ and $a_o=0.5\pi$ in implementing our algorithm.

We use a "matched filter" approach to define the distance and angle between two planar curves. That is, given a pair of planar curves, one of them is fixed as a reference and affine transformation is applied (i.e. translation and rotation) is applied to the other. The translation and rotation parameters that maximize the correlation between the two curves are defined as the distance and angle between the two curves. It is this tree-based approach that we are using to define the segmentation boundaries within a given image.

Figure 2D:
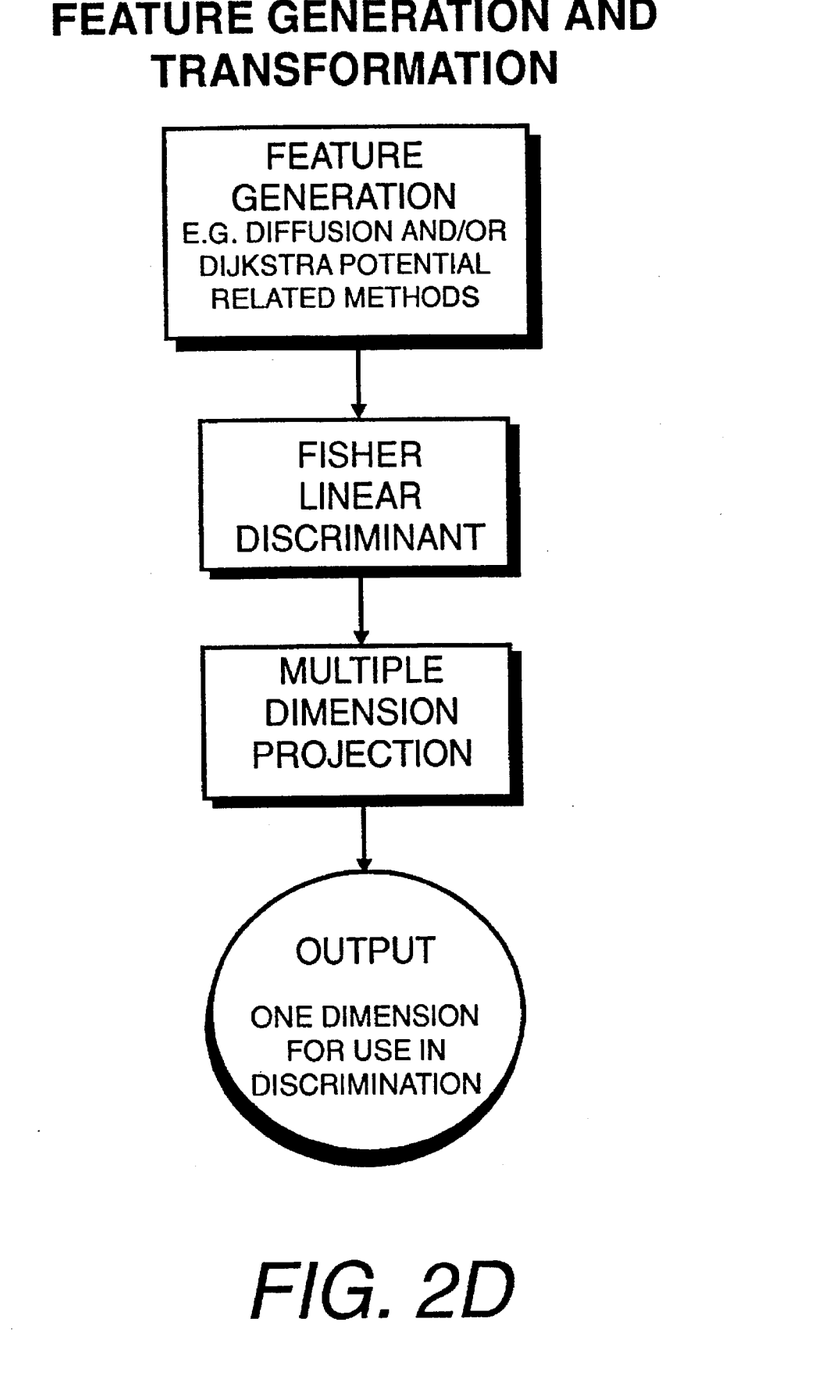

Once segmentation boundaries within an image are defined, we next incorporate boundary determinations into feature generation calculations for each pixel using one of two methods. This step is generically represented as step 104 in FIG. 1 and the top block shown in FIG. 2D. The first feature generation method to be described is diffusion related. In our feature calculations, we are essentially computing fractal dimension derived power law features. One particular feature of our first method for calculating feature calculations is that only nearest neighbor communication is required at all stages of the computation. We are motivated for this approach by the need to perform texture computations in near real time, as well as to readily be able to incorporate the segmentation boundaries into the overall method.

In assessing a given two-dimensional grayscale image, we can think of such an image as a manifold embedded in a three dimensional space. From this viewpoint, we can consider the image to have a fractal dimension that is somewhere between the image's topological dimension of two and the dimension of the embedding space, resulting in a fractal dimension value between two and three. The fractal dimension, as briefly discussed in the background, can be thought of as a characterization of roughness; or in other words, a quantitative measure of the "wiggliness" of an object. For our purposes, the defining equation for the fractal dimension of an image is Richardson's law (see equation (1) in the background). For purposes of convenience, we represent this expression below as equation (6):

$$M(\epsilon) = K \epsilon^{(d-D)} \qquad (6)$$

where $M(\epsilon)$ is the measured property of the fractal at scale $\epsilon$, K is a constant of proportionality, d is the topological dimension, and D is the fractal dimension. This law essentially describes the manner in which a measured property of a fractal varies as a function of the scale of the measuring device.

In order to use Richardson's law to estimate the fractal dimension of an image, we estimate the surface area of the image in a window about a given pixel. This method makes use of dilation and erosion operators which act recursively to bound the surface above and below at progressively larger scales. This results in a set of volume approximations at different scales which allow us to obtain estimates of the surface area as a function of scale. We define dilation and erosion operators for the pixel (i,j) at scale $\epsilon$ as $U(i,j;\epsilon)$ and $L(i,j;\epsilon)$, respectively. These operators can be defined recursively as:

$$U(i,j;\epsilon+1) = max\{U(i,j;\epsilon)+1, U(i+1,j;\epsilon), U(i-1,j;\epsilon), U(i,j+1;\epsilon), U(i,j-1;\epsilon)\} \qquad (7)$$

and $$L(i,j;\epsilon+1) = min\{L(i,j;\epsilon)+1, L(i+1,j;\epsilon), L(i-1,j;\epsilon), L(i,j+1;\epsilon), L(i,j-1;\epsilon)\} \qquad (8)$$

where the zero level recursions are defined as:

$$U(i,j;0) = L(i,j;0) = G(i,j) \qquad (9)$$

for an original image grayscale value $G(i,j)$. In order to take a potentially irregular segmentation boundary into account, we modify these recursion expressions as follows. Assume that a segmentation map $M(i,j)$ is given where $M(i,j)=0$ on a boundary and $M(i,j)=1$ for all pixels not on a boundary. We then introduce the new recursion relations $$U(i,j;\epsilon+1) = max\{U(i,j;\epsilon)+1, \quad [U(i+1,j;\epsilon)M(i+1,j) + U(i,j;\epsilon)(1-M(i+1,j))], \\ [U(i-1,j;\epsilon)M(i-1,j) + U(i,j;\epsilon)(1-M(i-1,j))], \\ [U(i,j+1;\epsilon)M(i,j+1) + U(i,j;\epsilon)(1-M(i,j+1))], \\ [U(i,j-1;\epsilon)M(i,j-1) + U(i,j;\epsilon)(1-M(i,j-1))]\} \qquad (10)$$

and $$L(i,j;\epsilon+1) = min\{L(i,j;\epsilon)+1, \quad [L(i+1,j;\epsilon)M(i+1,j) + L(i,j;\epsilon)(1-M(i+1,j))], \\ [L(i-1,j;\epsilon)M(i-1,j) + L(i,j;\epsilon)(1-M(i-1,j))], \\ [L(i,j+1;\epsilon)M(i,j+1) + L(i,j;\epsilon)(1-M(i,j+1))], \\ [L(i,j-1;\epsilon)M(i,j-1) + L(i,j;\epsilon)(1-M(i,j-1))]\} \qquad (11)$$

where the zero level recursions remain unchanged. In equations (10) and (11), the segmentation map prevents values on the boundary from being used outside the boundary. For example, if the (i+1,j) pixel is on a boundary while the (i,j) pixel is not, the $U(i,j;\epsilon)$ value is substituted for the $U(i+1,j;\epsilon)$ value. Hence, the $U(i+1,j;\epsilon)$ value will not affect computation of $U(i,j,\epsilon+1)$. Since operators recurse only one pixel at a time, we are guaranteed that no information will cross a continuous segmentation boundary at this stage of the computation.

Once the upper and lower surfaces at a given scale have been computed, the bounding area is given by:

$$a(i,j;\epsilon)=[U(i,j;\epsilon)-L(i,j;\epsilon)]/2\epsilon \quad (12)$$

However, this is not wholly satisfactory because of the large variation from pixel to pixel so that a local average is normally taken, resulting in an averaged area given by:

$$A(i,j;\epsilon) = \sum_{(l,m) \in W(i,j)} c[(U(l,m;\epsilon) - L(l,m;\epsilon))/2\epsilon] \quad (13)$$

where W(i,j) is a window about (i,j) and c is a constant for all scales that can be used for normalization, if desired. The fractal dimension can then be estimated on a pixel-by-pixel basis as a regression of log [A(ε)] versus log [ε] as indicated by Richardson's law (1) and (6). The method of computing the areas embodied in equation (13) using a fixed window does not readily accommodate the incorporation of segmentation boundaries. If used with boundaries, it will average across the boundary with attendant undesired effects. This problem has led us to introduce a method of averaging that is based on a resistive grid method of averaging.

Figure 3:
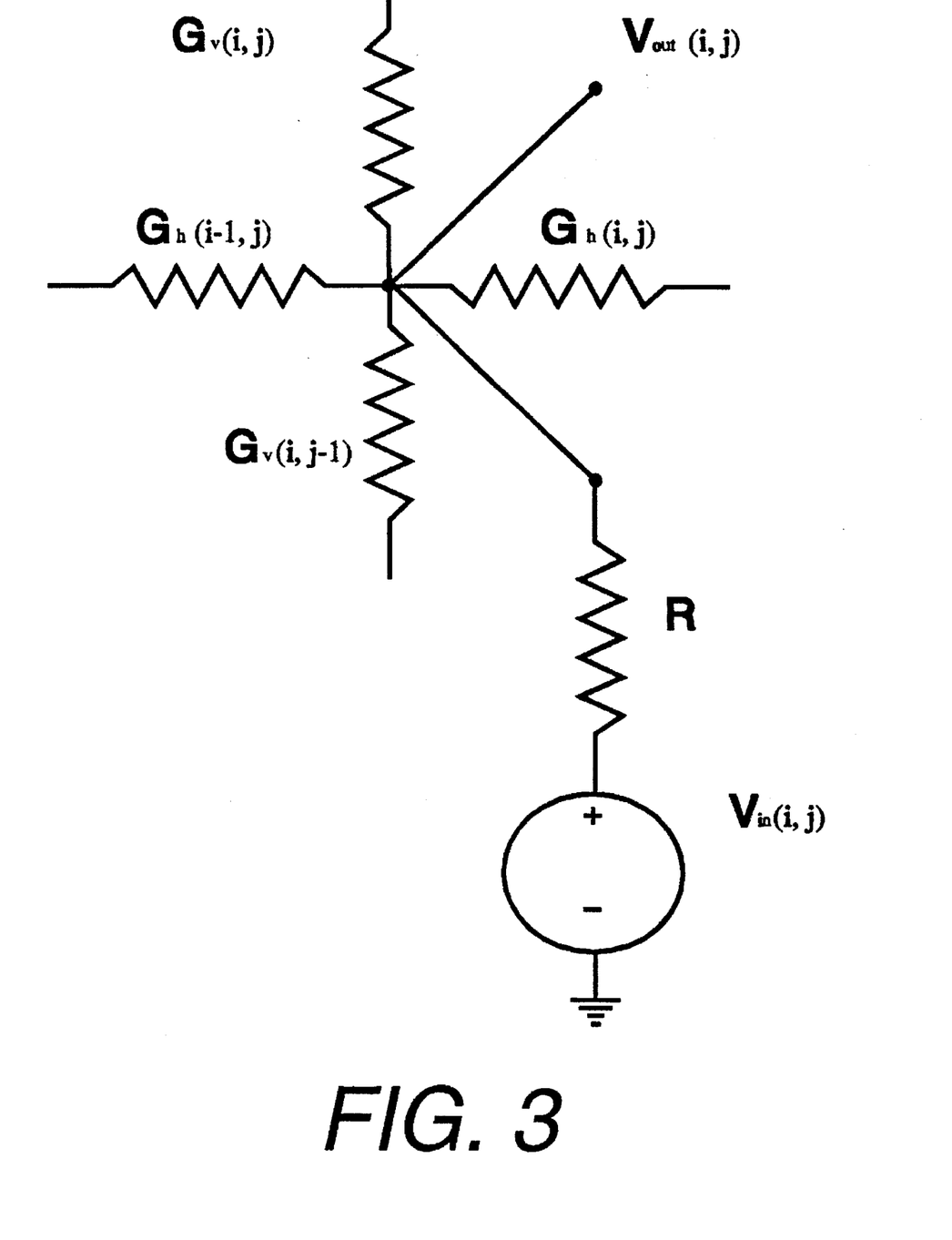
FIG. 3 illustrates a circuit model associated with a single pixel in the present invention.

In this method, we model each pixel as though it is connected to its four nearest neighbors by fixed conductances, and with an input at each pixel modeled as a voltage source connected to the pixel through a resistance. A circuit arranged in this manner is depicted in FIG. 3. In order to account for a regular or irregular segmentation boundary, we set all conductances to zero that connect to a pixel on the boundary. The circuit simulation then can viewed as adapting the effective kernel associated with each pixel so as to account for the segmentation boundaries. Regarding FIG. 3, the circuit equations can be written as:

$$V_{out}(i,j) = \{V_{in}(i,j)/R + V_{out}(i-1,j)G_h(i-1,j) + V_{out}(i+1,j)G_h(i,j) + V_{out}(i,j-1)G_v(i,j-1) + V_{out}(i,j+1)G_v(i,j)\}/\{(1/R) + G_h(i-1,j) + G_h(i,j) + G_v(i,j-1) + G_v(i,j)\} \quad (14)$$

where we have distinguished between horizontal and vertical conductance links and $V_{in}$ is given by $$V_{in}(i,j)=a(i,j;\epsilon) \quad (15)$$

This presents us with a coupled set of difference equations. We have solved this coupled system numerically by treating equation (14) as the fixed point of the differential equation $$(d/dt)V_{out}(i,j) = -V_{out}(i,j) + \quad (16)$$

$$\{V_{in}(i,j)/R + V_{out}(i-1,j)G_h(i-1,j) + V_{out}(i+1,j)G_h(i,j) +$$

$$V_{out}(i,j-1)G_v(i,j-1) + V_{out}(i,j+1)G_v(i,j)\}/\{(1/R) + G_h(i-1,j) +$$

$$G_h(i,j) + G_v(i,j-1) + G_v(i,j)\}$$

The set of coupled differential equations can then be integrated numerically to find the fixed point solution. In practice, we performed the integration by repreating the two steps $$v(i,j) = \alpha V_{out}(i,j) + (1 - \alpha) \{V_{in}(i,j)/R + \quad (17)$$

$$V_{out}(i-1,j)G_h(i-1,j) + V_{out}(i+1,j)G_h(i,j) + V_{out}(i,j-1)G_v(i,j-1) +$$

$$V_{out}(i,j+1)G_v(i,j)\}/\{(1/R) + G_h(i-1,j) + G_h(i,j) + G_v(i,j-1) + G_v(i,j)\}$$

$$V_{out}(i,j) = v(i,j) \quad (18)$$

and iterating the set of equations (17) and (18) until convergence. For α=0.5, convergence always occurred in less than 2000 steps for an effective decay length of $L=(GR)^{1/2}=16$. For smaller decay lengths the convergence is faster. After convergence, we set $$A(i,j;\epsilon)=V_{out}(i,j) \quad (19)$$

for scale ε.

Thus, in this method, the computation defined by the set of equations (12, 15, 17–19) replaces the computation embodied in equation (13).

Figure 4:
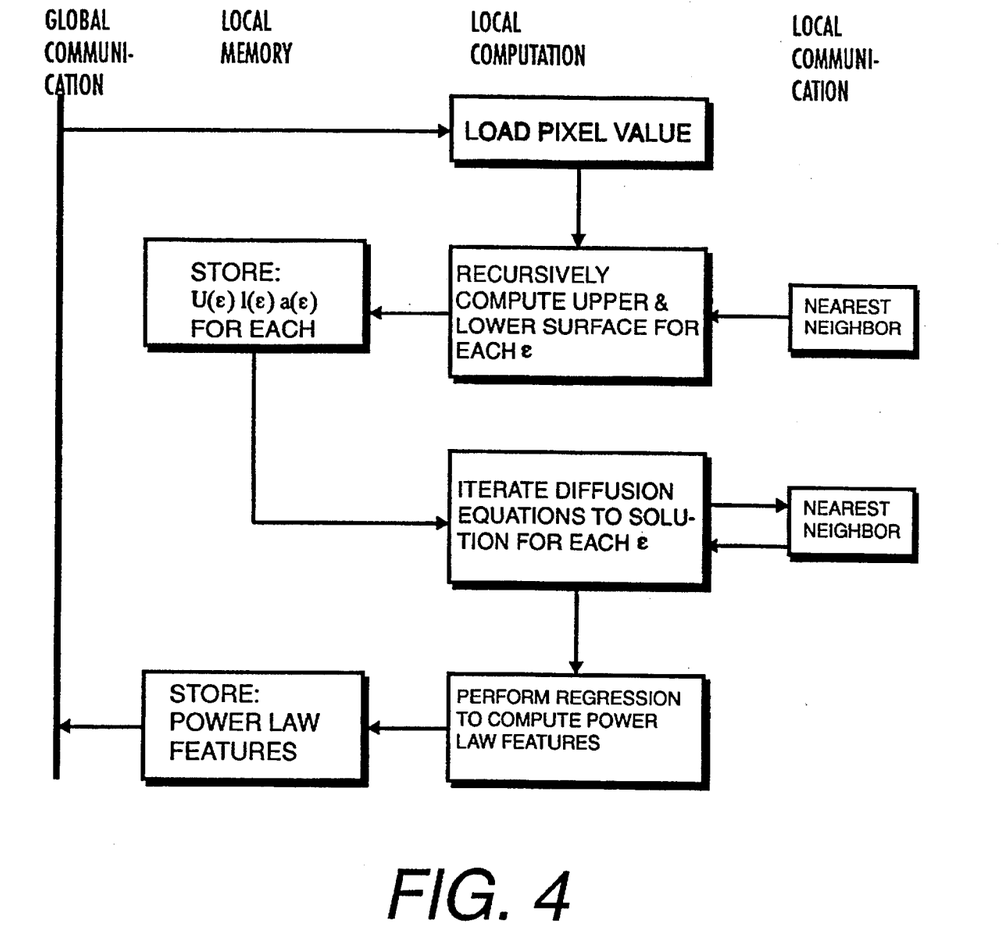
FIG. 4 illustrates a block diagram of power law feature computations at each pixel/processor in the present invention.

The final step in obtaining fractal dimension or the associated power law features is to perform a regression on log[A(i,j;ε)] against log [ε] to find the slope for each pixel. This is a local computation (i.e. no communication required). The quantity (2 minus slope) gives the fractal dimension while the y-intercept and the F-test of the regression provide m additional power law features. The computation is depicted schematically in FIG. 4 for a massively parallel implementation where one processor is dedicated to each pixel. Global communication is only required to distribute the image and the segmentation map, and to output the results. As can be seen from FIG. 4, each pixel is acted on independently. During the course of the computation only nearest neighbor communication is required and local memory requirements are minimal. This implies that we can do the same operation in parallel on every element in the data set, which has been described as data parallelism. This paradigm for computation is appropriate for computing devices with many thousands of processors. Complexity of this method is found to be of order $O(n^2/p)$, where the image consists of nxn=$n^2$ pixels and p is the number of processors. Because only nearest neighbor communication is required in this method, communication overhead is a constant and does not enter into system complexity. Therefore, as the number of processors approaches the number of pixels, the complexity approaches order O(1) and the steps required to produce the power law features is reduced to a level whereby real time or near real time processing can be achieved.

Our second method of calculating fractal dimension is based upon Dijkstra potential map. This approach utilizes the same erosion/dilation operators described in our first method and replaces the average area calculation over a variable window by a weighted average based on an adaptive kernel calculated from the Dijkstra potential. In this approach, V, s calculated over a window about a pixel from possible multiple costs, C. We have utilized window of fixed radius, r, as opposed to a variable window approach. Specifically, we have selected a window size of (2r+1)×(2r+1). We feel that this is appropriate as long as at the largest scale we have a kernel that is potentially greater than (2m+1)×(2m+1), where m is the largest scale. We say potentially since it will be possible for the segmentation map to limit the size of the kernel since it is adaptive.

The first step in calculating the potential is the creation of the cost map in a window about the pixel of interest. In the present calculations the window is of fixed size for all scales and two types of costs are considered. The first is the cost of connecting to a boundary pixel which will be set to a large value (this is a parameter in our calculations and is set to 10,000). If a pixel is connected to a non-boundary pixel the cost is zero. The second type of cost is based on the shortest path from the current pixel to the window's central pixel. The distance used for the current calculations is based not on the physical distance between pixel centers, but rather on the number of steps required to move from the central pixel to the current pixel. Other costs could easily be envisioned that could contribute to the potential such as contrast changes.

Next, we initialize the potential, $V^0$, within the window so that all potentials are set to a large value (e.g, 10,000) except for the central pixel which is set to zero. The four nearest-neighbor potential update equation $$V^{\alpha+1}{}_{k,l} = min\{V^{\alpha}{}_{k,l}, V^{\alpha}{}_{k-1,l}+C_{k-1,l}, V^{\alpha}{}_{k+1,l}+C_{k+1,l}, V^{\alpha}{}_{k,l-1}+C_{k,l-1}, V^{\alpha}{}_{k,l+1}+C_{k,l+1}\} \quad (20)$$

$$\forall k,l \in W_{i,j}$$

is then iterated until convergence. By taking advantage of the wave-like property of the calculation, we can reduce the number of operations required to compute the potential over the window. This is accomplished by recursively calculating the potential over a sub-window that grows by one pixel in each direction every iteration until the sub-window is the same size as the window W. The calculation is then repeated until convergence of the potentials over W is obtained. The computation for the eight nearest-neighbor case is entirely analogous and differs only by the additional costs and potential terms along the diagonals.

For a window with radius, r, convergence will require a minimum of r steps and the maximum number of steps is related to the maximum path length that can be constructed in a window. To further reduce computation time it may be worthwhile to determine if a boundary is present within the window. If no segment is found, a pre-computed potential may be stored and used as necessary. In the present simulations the use of a pre-computed potential eliminated up to 80% of the possible potential calculations.

Finally, the average area about pixel i,j is computed by performing a weighted summation over the sample window.

$$A^{\epsilon}_{i,j} = \sum_{k,l \in W_{i,j}} a^{\epsilon}_{k,l} w_{k,l} / \sum_{k,l \in W_{i,j}} w_{k,l} \quad (21)$$

where $a_{k,l}$ is the area calculated at node k,l and w is a weight function given by $$w_{k,l}=1 \text{ when } V_{k,l}<\lambda, \text{ and } 0 \text{ otherwise} \quad (22)$$

for a square kernel where $\lambda$ is a parameter, or $$w_{k,l}=(1/\sqrt{2\pi}\sigma)exp(-V^2{}_{k,l}/2\sigma^2) \quad (23)$$

for a Gaussian kernel where $\sigma$ is a prescribed standard deviation. The choice of $\lambda$, or $\sigma$ will depend upon the r selected. We have chosen $\lambda=r$ and $\sigma=(r-1)/3$. Thus, for four nearest neighbors we average over a diamond-shaped area and for eight nearest neighbors we utilize the entire window when no boundaries are present. In the presence of boundaries the averaging area will be smaller. This second method of computing fractal dimension utilizing Dijkstra potential maps produces analogous results to the first method which is diffusion related. That is, the second method will also operate with incomplete, irregular, and multi-valued boundaries. Preferably, both methods are included in the image analysis system in order to cover any cases in which one method may yield more satisfactory results than the other.

In order to reduce the complexity of further necessary calculations, our system is capable of applying the Fisher linear discriminant (hereafter "FLD") when necessary. This step is generically depicted as step 105 of FIG. 1, and in the bottom three blocks of FIG. 2D. The FLD allows the projection of the three dimensions associated with each pixel to the one dimension that is in some sense best for discrimination and thus decreases the computational complexity. Additionally, this projection eases the problem of illustration since we are able to plot the results.

For each class of training data we have some number of observations (i.e. features of the pixels) that we label as $X_i$ which represents the observations from class i (where i=1, 2 for two classes which we can use as an example). Using the fractal features as components we can represent each observation vector as $\underline{X}=[X_1, X_2, X_3]^T$, where each observation vector $\underline{X}$ is contained in the set $X_i$. The FLD yields a projection vector whose use results in a projected one dimensional observation Y for each vector $\underline{X}$. Thus we obtain a set of observations $Y_i$ for each class i. Then we employ a normalization transformation which yields $Y'_1$ with a mean of 0 and a variance of 1. This same transformation is applied to class 2 of the projected observations yielding $Y'_2$ from $Y_2$.

Figure 2E:
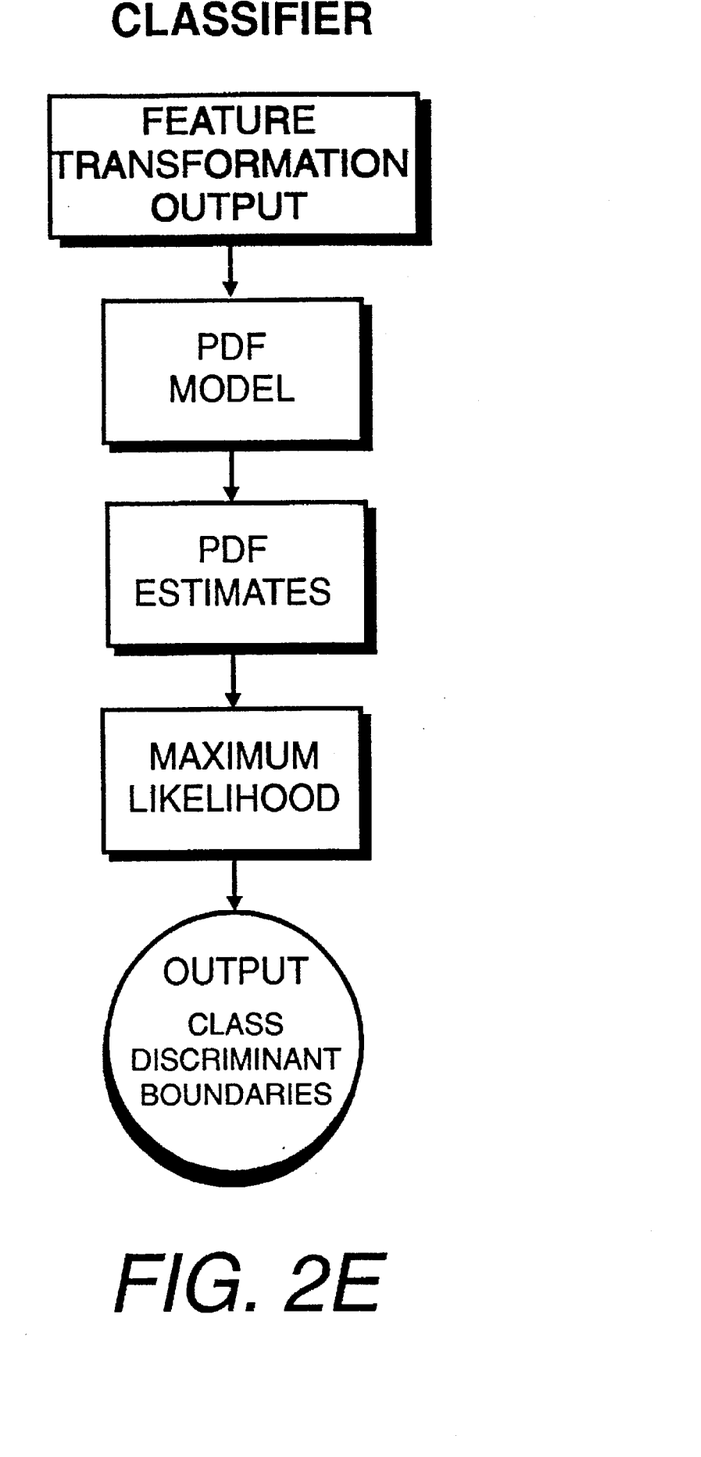

The system next performs a classification operation by estimating probability density functions (hereafter "pdf") using adaptive mixtures. This step is generically depicted as step 106 in FIG. 1, and is further defined in FIG. 2E. Once classification has been performed, region identification and a probabilistic ranking can then be made in step 107. The pdf is analogous to a mass density which is described with respect to some variable (e.g. the mass density of the earth as a function of distance from the center). Here, the probability density will be a function of the image data. By using adaptive mixtures to estimate the pdf, we are not required to make strict assumptions about the actual statistical distribution of the data. Adaptive mixtures is basically a hybrid approach designed to maintain the best features of both kernel estimation and finite mixture models. That is, we do not assume that the data is normally distributed. By estimating the pdfs for $Y'_1$ and $Y'_2$, we are able to determine the discriminant boundary between the classes. This discriminant boundary is determined using the maximum likelihood ratio. For a different (new) image containing textures to be determined, the FLD projection vector and the normalization transformation which were determined from the training data are applied. The system then estimates the pdfs for the two classes of data from the new image using the projected and transformed data. Hence, the classes in the new image can then be identified. That is, textures within new images can be determined by comparing the probability density function of each pixel within the new image to previously determined discriminant boundaries. Then texture classes within the new image are labelled with a probabilistic ranking based on probability density functions previously determined from known texture classes.

Figure 5:
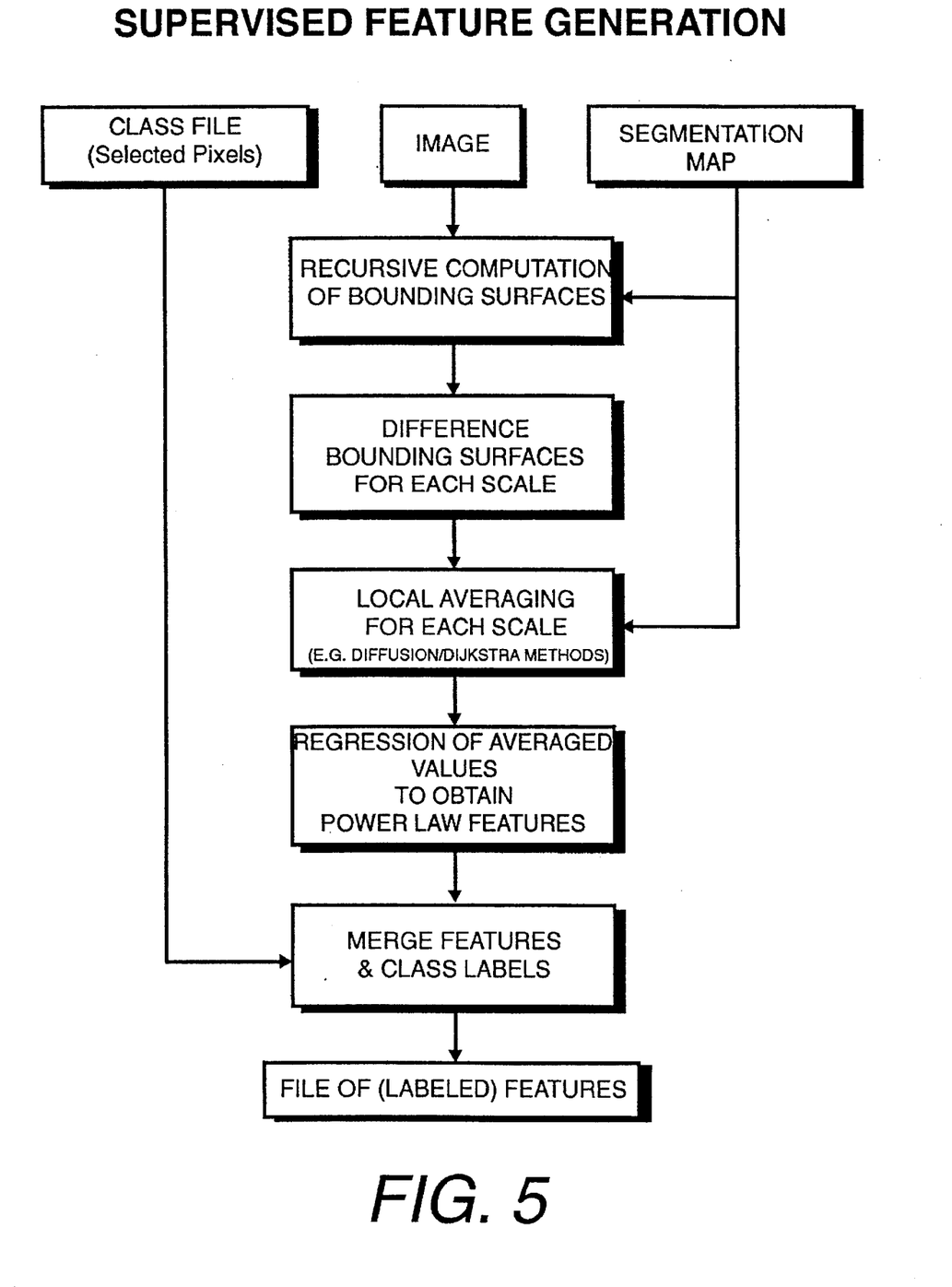
FIG. 5 illustrates system operation for supervised feature generation.
Figure 6:
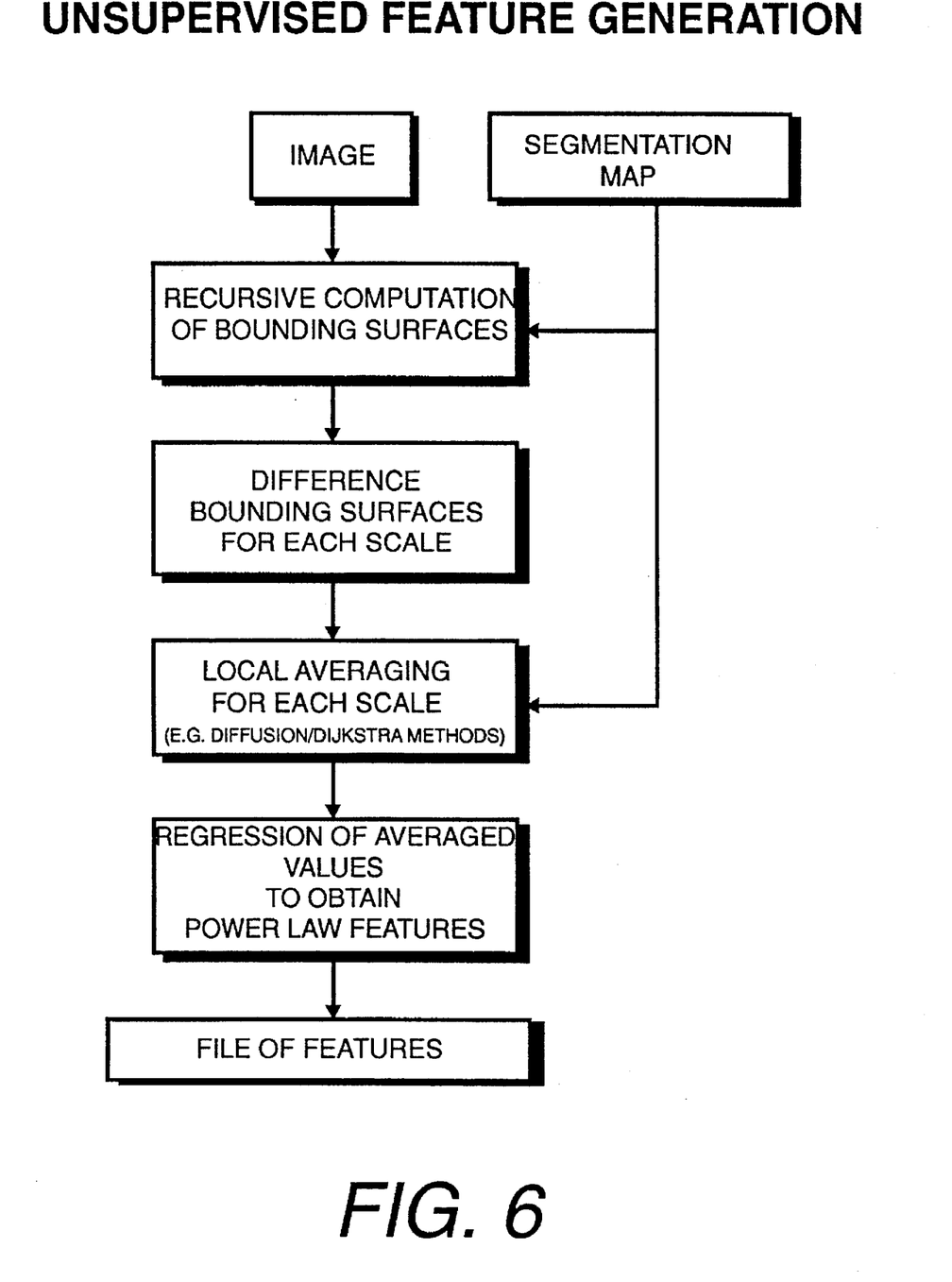
FIG. 6 illustrates system operation for unsupervised feature generation.

Accordingly, the present invention is capable of classifying various textures within an image, and then later using these established texture classifications to discriminate among textures in other images. A flowchart summarizing this supervised feature generation method is shown in FIG. 5. Advantageously, the method according to FIG. 5 generates a file of labeled features using a step for merging features and class labels. Alternatively, the present invention provides that texture discrimination can be performed independently of any established texture classifications. An overview of a system performing such unsupervised feature generation is summarized in FIG. 6. Thus, a file of distinct features is generated responsive to power law features.

While our solution to the long-felt need of providing textually pure images may appear intuitive at first glance, several factors strongly indicate to the contrary. First, a survey of the prior art clearly shows that such a solution has not even been recognized by those skilled in the art. Secondly, there have been no legitimate attempts to address this need using the series of techniques upon which our solution is based.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for distinguishing and classifying textures of an image in a supervised feature generation system, said method comprising the steps of:

generating a digitized image representative of said image;

reading and storing a digitized image file in dependence upon said digitized image;

reading and storing texture classification information representative of selected pixels within said image;

reading and storing a segmentation map representative of segmentation boundaries within said image;

recursively computing bounding areas within said image as a function of scale in dependence upon said digitized image file and said segmentation map;

computing intensity differences among bounding areas for each scale;

determining local area averages for each said scale in dependence upon said intensity differences and said segmentation map;

computing power law features;

merging said power law features and said texture classification information to produce a file of distinct and labeled features;

building a probability density function of said image using adaptive mixtures, by estimating a probability density function for each class of texture within said image and then determining class discriminant boundaries in dependence upon a maximum likelihood ratio; and, determining texture classes within a new digital image by comparing the probability density function of each pixel within said new digital image to previously determined discriminant boundaries and then labeling said texture classes within said new digital image with a probabilistic ranking based on probability density functions previously determined from known texture classes.

2. A method for distinguishing and classifying textures of an image in a supervised feature generation system, said method comprising the steps of:

generating a digitized image representative of said image;

reading and storing a digitized image file in dependence upon said digitized image;

reading and storing texture classification information representative of selected pixels within said image;

reading and storing a segmentation map representative of segmentation boundaries within said image;

recursively computing bounding areas within said image as a function of scale in dependence upon said digitized image file and said segmentation map;

determining weighted area averages for each said scale in dependence upon an adaptive kernel calculated from a Dijkstra potential and said segmentation map;

computing power law features for pixels within said image in dependence upon said weighted area averages;

distinguishing among textures present within said image in dependence upon said power law features; and merging said power law features and said texture classification information to produce a file of distinct and labeled features.

3. The method for distinguishing and classifying textures as claimed in claim 2, further comprised of utilizing one of a digital scanner and a sensor to generate said digitized image.

4. The method for distinguishing and classifying textures as claimed in claim 2, further comprised of preprocessing said digitized image using contrast enhancement techniques.

5. The method for distinguishing and classifying textures as claimed in claim 2, further comprised of recursively computing said bounding areas within said image using erosion and dilation operations.

6. The method for distinguishing and classifying textures as claimed in claim 2, further comprised of defining said segmentation map using wavelet theory.

7. The method for distinguishing and classifying textures as claimed in claim 2, further comprised of projecting multiple dimensions associated with each pixel within said image to one dimension using a Fisher linear discriminant.

8. The method for distinguishing and classifying textures as claimed in claim 2, further comprised of building a probability density function model of said image using adaptive mixtures.

9. The method for distinguishing and classifying textures as claimed in claim 8, further comprised of building said probability density function model by estimating a probability density function for each class of texture within said image and then determining class discriminant boundaries in dependence upon a maximum likelihood ratio.

10. The method for distinguishing and classifying textures as claimed in claim 9, further comprised of determining texture classes within a new digital image by comparing the probability density function of each pixel within said new digital image to previously determined discriminant boundaries and then labeling said texture classes within said new digital image with a probabilistic ranking based on probability density functions previously determined from known texture classes.

11. A method for distinguishing and classifying textures of an image in an unsupervised feature generation system, said method comprising the steps of:

generating a digitized image representative of said image;

reading and storing a digitized image file in dependence upon said digitized image;

reading and storing a segmentation map representative of said image;

recursively computing bounding areas within said image as a function of scale in dependence upon said digitized image file and said segmentation map;

determining weighted area averages for each said scale in dependence upon an adaptive kernel calculated from a Dijkstra potential and said segmentation map;

computing power law features for pixels within said image in dependence upon said weighted area averages;

distinguishing among textures present within said image in dependence upon said power law features; and generating a file of distinct unlabeled features in dependence upon said power law features.

12. The method for distinguishing and classifying textures as claimed in claim 11, further comprised of utilizing one of a digital scanner and a sensor to generate said digitized image.

13. The method for distinguishing and classifying textures as claimed in claim 11, further comprised of preprocessing said digitized image using contrast enhancement techniques.

14. The method for distinguishing and classifying textures as claimed in claim 11, further comprised of recursively computing said bounding areas within said image using erosion and dilation operations.

15. The method for distinguishing and classifying textures as claimed in claim 11, further comprised of defining said segmentation map using wavelet theory.

* * * * *